(12) United States Patent
Cristache et al.

(10) Patent No.: US 8,745,486 B2
(45) Date of Patent: Jun. 3, 2014

(54) STREAMABLE INTERACTIVE RENDERING-INDEPENDENT PAGE LAYOUT

(75) Inventors: Nicoleta Cristache, Redmond, WA (US); Donovan R. Smith, Sammamish, WA (US); Christopher A. Hays, Monroe, WA (US)

(73) Assignee: Microsoft Corporation, Redmond, WA (US)

( * ) Notice: Subject to any disclaimer, the term of this patent is extended or adjusted under 35 U.S.C. 154(b) by 1092 days.

(21) Appl. No.: 11/627,270

(22) Filed: Jan. 25, 2007

(65) Prior Publication Data

US 2008/0189602 A1  Aug. 7, 2008

(51) Int. Cl.

| | | |
|---|---|---|
| G06F 17/30 | (2006.01) |
| G06F 9/45 | (2006.01) |
| G06F 9/44 | (2006.01) |
| G06F 9/455 | (2006.01) |
| G06F 9/50 | (2006.01) |
| G06F 11/00 | (2006.01) |
| G06F 11/16 | (2006.01) |
| G06F 12/00 | (2006.01) |
| G06F 12/02 | (2006.01) |
| G06F 17/40 | (2006.01) |
| H04L 29/08 | (2006.01) |
| H04W 28/06 | (2009.01) |
| H04W 4/00 | (2009.01) |

(52) U.S. Cl.
CPC ............ *G06F 17/30312* (2013.01); *G06F 8/40* (2013.01); *G06F 8/443* (2013.01); *G06F 8/447* (2013.01); *G06F 8/52* (2013.01); *G06F 8/76* (2013.01); *G06F 9/4428* (2013.01); *G06F 9/4436* (2013.01); *G06F 9/45504* (2013.01); *G06F 9/45516* (2013.01); *G06F 9/50* (2013.01); *G06F 9/5038* (2013.01); *G06F 11/008* (2013.01); *G06F 11/1641* (2013.01); *G06F 12/00* (2013.01); *G06F 12/02* (2013.01); *G06F 12/023* (2013.01); *G06F 12/0246* (2013.01); *G06F 12/0253* (2013.01); *G06F 8/34* (2013.01); *G06F 17/40* (2013.01); *H04L 67/02* (2013.01); *H04L 67/10* (2013.01); *H04W 28/06* (2013.01); *H04W 4/00* (2013.01)
USPC .......................................................... 715/243

(58) Field of Classification Search
CPC ............ G06F 8/34; G06F 8/40; G06F 8/443; G06F 8/447; G06F 8/52; G06F 8/76; G06F 9/4428; G06F 9/4436; G06F 9/45504; G06F 9/45516; G06F 9/50; G06F 9/5038; G06F 11/008; G06F 11/1641; G06F 12/00; G06F 12/02; G06F 12/023; G06F 12/0246; G06F 12/0253; G06F 17/30312; G06F 17/40; H04L 67/02; H04L 67/10; H04W 28/06; H04W 4/00
USPC .......................................................... 715/243
See application file for complete search history.

(56) References Cited

U.S. PATENT DOCUMENTS 5,852,819 A    12/1998  Beller
6,023,714 A  *  2/2000  Hill et al. ...................... 715/235

(Continued)

FOREIGN PATENT DOCUMENTS

| EP | 0838774 A2 | 4/1998 |
| JP | 2000-57069 | 2/2000 |
| JP | 2006-092392 | 4/2006 |

OTHER PUBLICATIONS

Google Search for "non-predefined visual sort" or "non predefined visual sort," performed Sep. 21, 2010.*

(Continued)

*Primary Examiner* — Doug Hutton, Jr.
*Assistant Examiner* — Andrew Dyer
(74) *Attorney, Agent, or Firm* — Nicholas Chen; David Andrews; Micky Minhas

(57) ABSTRACT

A computer output display system is provided. The system includes a layout component to determine one or more rendering rules that are applicable to a subset of display output controls. A format component communicates the rendering rules via a generic protocol that is employed by the subset of display output controls to render a display.

18 Claims, 10 Drawing Sheets

(56) References Cited

U.S. PATENT DOCUMENTS

| | | | |
|---|---|---|---|
| 6,292,842 B1 | 9/2001 | Crouch et al. | |
| 6,336,124 B1 * | 1/2002 | Alam et al. | 715/205 |
| 6,370,569 B1 * | 4/2002 | Austin | 709/217 |
| 6,377,993 B1 * | 4/2002 | Brandt et al. | 709/227 |
| 6,549,918 B1 * | 4/2003 | Probert et al. | 1/1 |
| 6,615,258 B1 * | 9/2003 | Barry et al. | 709/223 |
| 6,751,653 B2 * | 6/2004 | Austin | 709/217 |
| 6,760,043 B2 | 7/2004 | Markel | |
| 6,925,468 B1 * | 8/2005 | Bobbitt et al. | 707/102 |
| 7,055,095 B1 | 5/2006 | Anwar | |
| 7,111,286 B2 * | 9/2006 | Schrader et al. | 717/143 |
| 7,213,748 B2 * | 5/2007 | Tsuei et al. | 235/380 |
| 7,225,249 B1 * | 5/2007 | Barry et al. | 709/227 |
| 7,260,580 B2 * | 8/2007 | Gauweiler et al. | 1/1 |
| 7,496,835 B1 * | 2/2009 | Chen et al. | 715/234 |
| 7,567,262 B1 * | 7/2009 | Clemens et al. | 345/632 |
| 7,669,193 B1 * | 2/2010 | Chipman | 717/152 |
| 7,689,703 B2 * | 3/2010 | Pasumansky et al. | 709/230 |
| 7,840,600 B1 * | 11/2010 | Bhatia | 707/793 |
| 2001/0051881 A1 * | 12/2001 | Filler | 705/3 |
| 2002/0161907 A1 * | 10/2002 | Moon | 709/230 |
| 2002/0194219 A1 * | 12/2002 | Bradley et al. | 707/506 |
| 2002/0194227 A1 * | 12/2002 | Day et al. | 707/523 |
| 2003/0005228 A1 * | 1/2003 | Wong et al. | 711/121 |
| 2003/0011805 A1 * | 1/2003 | Yacoub | 358/1.15 |
| 2003/0033212 A1 * | 2/2003 | Sandhu et al. | 705/26 |
| 2003/0083847 A1 * | 5/2003 | Schertz et al. | 702/186 |
| 2003/0147369 A1 * | 8/2003 | Singh et al. | 370/338 |
| 2003/0182305 A1 * | 9/2003 | Balva et al. | 707/103 R |
| 2003/0208460 A1 | 11/2003 | Srikant et al. | |
| 2003/0225829 A1 | 12/2003 | Pena et al. | |
| 2003/0229845 A1 | 12/2003 | Salesin et al. | |
| 2004/0003119 A1 * | 1/2004 | Munir et al. | 709/246 |
| 2004/0031030 A1 * | 2/2004 | Kidder et al. | 717/172 |
| 2004/0133855 A1 * | 7/2004 | Blair et al. | 715/517 |
| 2004/0148375 A1 * | 7/2004 | Levett et al. | 709/223 |
| 2004/0168119 A1 * | 8/2004 | Liu et al. | 715/501.1 |
| 2004/0193644 A1 | 9/2004 | Baker et al. | |
| 2005/0052696 A1 | 3/2005 | Silverbrook et al. | |
| 2005/0209892 A1 * | 9/2005 | Miller | 705/4 |
| 2005/0251740 A1 | 11/2005 | Shur et al. | |
| 2005/0278615 A1 | 12/2005 | Wang et al. | |
| 2006/0004745 A1 * | 1/2006 | Kuhn et al. | 707/4 |
| 2006/0005112 A1 * | 1/2006 | Lilly et al. | 715/500 |
| 2006/0026167 A1 * | 2/2006 | Pasumansky et al. | 707/10 |
| 2006/0031756 A1 * | 2/2006 | Dirstine | 715/513 |
| 2006/0031760 A1 * | 2/2006 | Jacobs | 715/517 |
| 2006/0048048 A1 | 3/2006 | Welcker et al. | |
| 2006/0090006 A1 | 4/2006 | Wu | |
| 2006/0143340 A1 * | 6/2006 | Labar | 710/62 |
| 2006/0149785 A1 | 7/2006 | Ornstein et al. | |
| 2007/0032922 A1 * | 2/2007 | Gvillo | 701/3 |
| 2007/0038683 A1 * | 2/2007 | Dixon et al. | 707/202 |

OTHER PUBLICATIONS

PostScript Language Reference; Feb. 1999; Adobe Systems Incorporated; Third Edition; pp. 1-897.*

Niemeyer et al.; Learning Java; 2000; O'Reilly Media, Inc.; pp. 1-27, 29-62, and 443-468.*

Hans-W. Gellersen and Martin Gaedke, Objectoriented Web Application Development, IEEE Internet Computing, Jan.-Feb. 1999, http://computer.org/internet/.

International Search Report and Written Opinion, cited in PCT/US2008/051510, date of Mailing Jun. 25, 2008; 13 pages.

Chinese Patent Office's First Office Action, cited in Application No. 200880003194.3, dated Aug. 6, 2010 (in Chinese with English translation attached); 9 pages.

Chinese Patent Office's Second Office Action, cited in Application No. 200880003194.3, dated Jan. 19, 2011 (in Chinese with English translation attached); 13 pages.

Chinese $3^{rd}$ Office Action in Chinese Application 200880003194.3, mailed Nov. 9, 2011, 6 pgs.

Chinese 4th Office Action in Chinese Application 200880003194.3, mailed Mar. 19, 2012, 7 pgs.

Chinese 5th Office Action in Chinese Application 200880003194.3, mailed Jul. 27, 2012, 7 pgs.

Chinese Notice of Allowance in Application 200880003194.3, mailed Nov. 7, 2012, 4 pgs.

Japanese Notice of Rejection in Application 2009-547365, mailed Oct. 12, 2012, 9 pgs.

Japanese Notice of Rejection in Application 2009-547365, mailed Aug. 15, 2013, 5 pgs.

* cited by examiner

PRIOR ART  FIG. 8

STREAMABLE INTERACTIVE RENDERING-INDEPENDENT PAGE LAYOUT

BACKGROUND

It is common for information consumers to request that dynamically generated information be rendered according to different techniques depending on the tools or devices used. Among these techniques are: direct drawing to a computer screen; printing; HTML instructions; PDF formats; Word formats, and so forth. While some existing systems (in particular, reporting systems) can perform core data calculations a single time for multiple rendering targets, no system has managed to deal with the problem of performing or sharing layout/pagination calculations across formats. For instance, each output format currently requires a separate renderer, which lays out and paginates the calculated data, and generates the desired format as illustrated in prior art drawing FIG. 8.

Referring to FIG. 8 a prior art rendering system 800 is illustrated, data 810 and report definition information 820 are processed at 830 to generate five different rendering formats for five different renderers at 840 in this example (e.g., HTML, RGDI, Image, Excel, PDF). Output from the renderers 840 is sent to various display controls 850 for subsequent display. The system 800 presents a simplified view of a prior art rendering architecture. When a client application at 850 requests one or more pages of a report in a target format, the Report Processing module 830 acts upon the Data 810 based on the instructions contained in the Report Definition 820. The resulting processed report data is provided to one of a number of rendering modules at 840, depending on which was requested by the client application at 850: HTML, RGDI (a remote drawing instructions stream), Image, Excel, PDF, and so forth.

Each renderer 840 utilizes its own pagination and layout logic to generate the target output format. The resulting file or stream is then passed to the client application at 850. In the case of a Webforms control, HTML is embedded in the generated web page which is displayed to the user in a web browser. In the case of a Winforms control, an RGDI stream is interpreted as drawing instructions to directly draw the page on the user's screen. In the case of a Print control, the image file contains all requested pages of the report and is passed to a printer. In other cases, the output file is simply downloaded to the client machine.

The current approach illustrated by the system 800 has a number of undesirable limitations. In one aspect, the system 800 lacks layout/pagination consistency across various output display formats. Since each renderer implements its own layout/pagination logic, variances in that logic inevitably arise, leading to subtly (or occasionally dramatically) different layout/pagination depending on the output type chosen. Another deficiency in the system 800 is that there is unnecessary computational load since the layout/pagination is redundantly recalculated for each requested format. Adding to the loading problem, there is redundant handshaking and controls that are passed between applications to adequately support the various formats.

SUMMARY

The following presents a simplified summary in order to provide a basic understanding of some aspects described herein. This summary is not an extensive overview nor is it intended to identify key/critical elements or to delineate the scope of the various aspects described herein. Its sole purpose is to present some concepts in a simplified form as a prelude to the more detailed description that is presented later.

A rendering architecture is provided to process various display formats according to a generic protocol which mitigates processing load and simplifies communications between systems. A layout component determines layout and pagination rules for a desired display output at a computer. The rules are then formatted according to a generic protocol that can be processed remotely via one or more display controls. For example, the generic protocol could be rendered by a Web display control that employs the protocol to then output HTML code. For a printer control, the generic protocol can be sent to a printer application for respective display. By determining a set of display rules and then transporting the rules according to the generic protocol, parallel processing at the display generation side is mitigated since the parallel processing for each type of protocol in previous systems can be reduced to computing the generic protocol. Rather than transmitting instructions for each type of protocol for each display format as in previous systems, a single set (or reduced set) of instructions can be transmitted that improves network communications between systems (e.g., between servers generating display data and clients rendering the data).

The rendering architecture and generic protocol provide many benefits over previous systems which essentially employed parallel processing components for each type of display protocol. If seven different protocols were supported for example, then seven different rendering generators were utilized at a server end with seven different display controls employed on the client end. Thus, there are several advantages realized by the rendering architecture and generic protocol over such parallel architectures. In one aspect, the architecture allows computation to be distributed between server and client (or other configurations). By dividing the previous rendering task into at least two distinct subtasks (e.g., layout/pagination and target output generation), the two modules can be utilized in a client-server architecture, with the client performing the final target output generation. Previously, for the output generation to occur on the client, layout and pagination would also have to occur on the client. This would necessitate passing the entire set of data to the client at once, eliminating the performance and scale benefits of pagination.

Another feature of the rendering architecture is that it enables edit-ability in rich clients. The prior art approach passed the specific target format to the client application. For example, HTML would be sent to a web-based application and image drawing instructions (e.g., Remote GDI [RGDI] or EMF) may be sent to a Windows-based application. These formats do not contain sufficient metadata to allow clients to map rendered objects back to the original definition used to generate the output. Thus, a rendering-independent format provided by the generic protocol can include such additional metadata.

Still yet another feature provides independently persistable rendering-independent pages. By exposing the output of a layout/pagination module as a stream, each page (or set of pages) becomes an independently persistable object which can be saved, shared, emailed and otherwise managed as a document without losing the ability to subsequently render it in any desired output format. Another feature includes allowing for more robust rendering based on client-side capabilities. In the case where the output generation is handled on the client, that client-side application can account for variations in the client environment which cannot be handled by full server-side rendering. For example, in the event of desired fonts not being present on the client machine, the output generation module can make minor adjustments to the output to take into account variances in the font metrics of the substituted font. This was not possible in previous integrated server-side rendering.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

A computerized system is provided to display data at remote locations according to a common or generic rendering protocol and format. In one aspect, a computer output display system is provided. The system includes a layout component to determine one or more rendering rules that are applicable to a subset of display output controls. A format component communicates the rendering rules via a generic protocol that is employed by the subset of display output controls to render a display.

As used in this application, the terms "component," "protocol," "layout," "stream," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Figure 1:
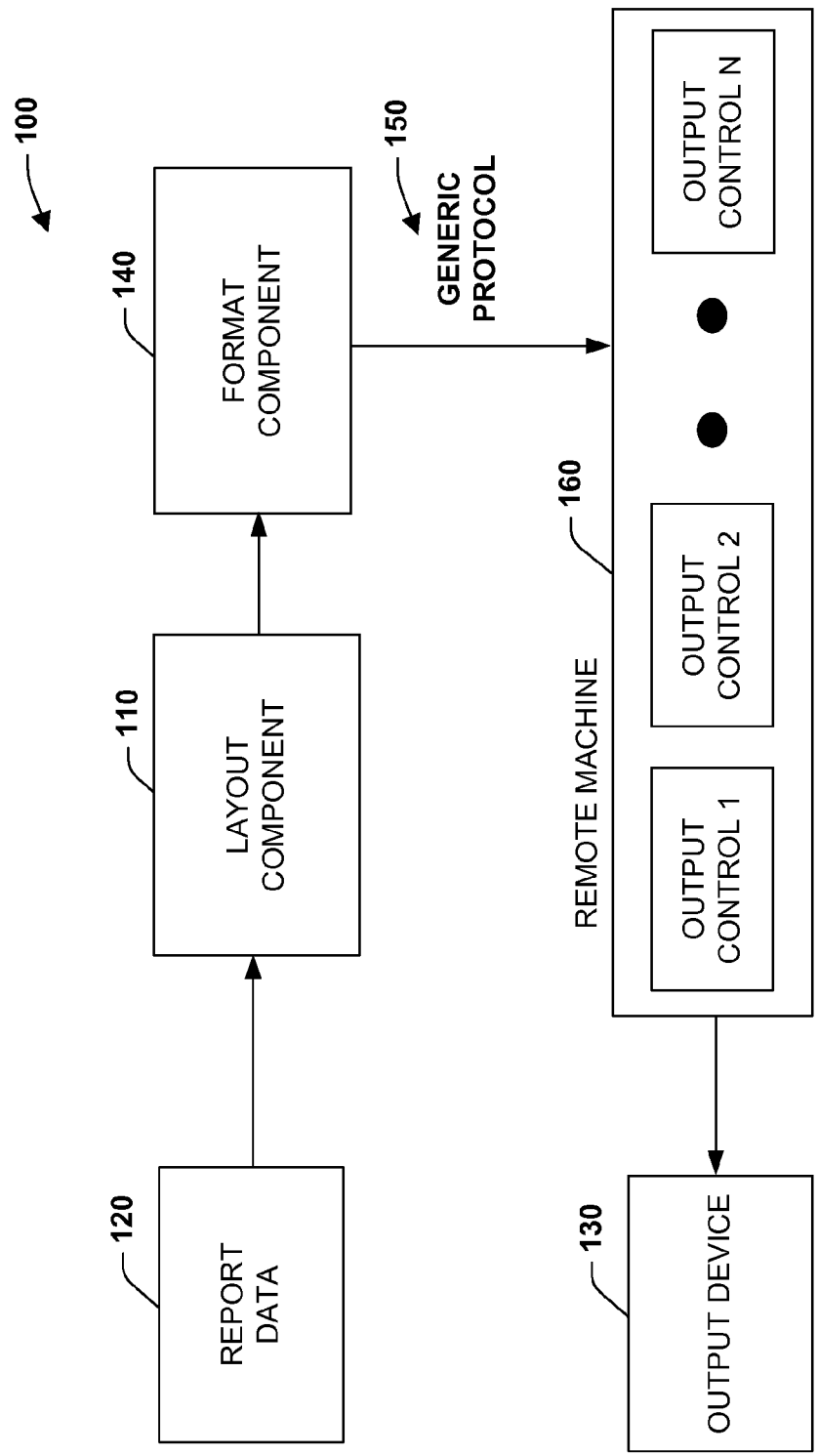
FIG. 1 is a schematic block diagram illustrating a computerized display system.

Referring initially to FIG. 1, a computerized display system 100 is illustrated to facilitate rendering of data. The system 100 includes a layout component 110 that processes report data 120 and determines one or more rules that are employed to format data for a display or other output device 130 (e.g., printer, LCD display, CRT). For example, the rules may specify pagination options for display or other layout considerations which are described in more detail below. A format component 140 which can be part of the layout component 110 generates a generic protocol 150 that is employed by a remote machine 160 to drive the output device 130. In one example, the layout component 110 and format component 140 may be part of a server side architecture that transmits the generic protocol 150 to the remote machine 160 acting as a client machine.

As shown, the remote machine 160 includes one or more output controls to drive the output device 130. For example, one output control may be employed to render data via the generic protocol 150 at the output device 130 in a first output format (e.g., HTML) while another output control would utilize the generic protocol to output a different output format (e.g., printer protocol). Before proceeding it is noted that the layout component 110 can be provided functionally in more than one component as shown.

Figure 8:
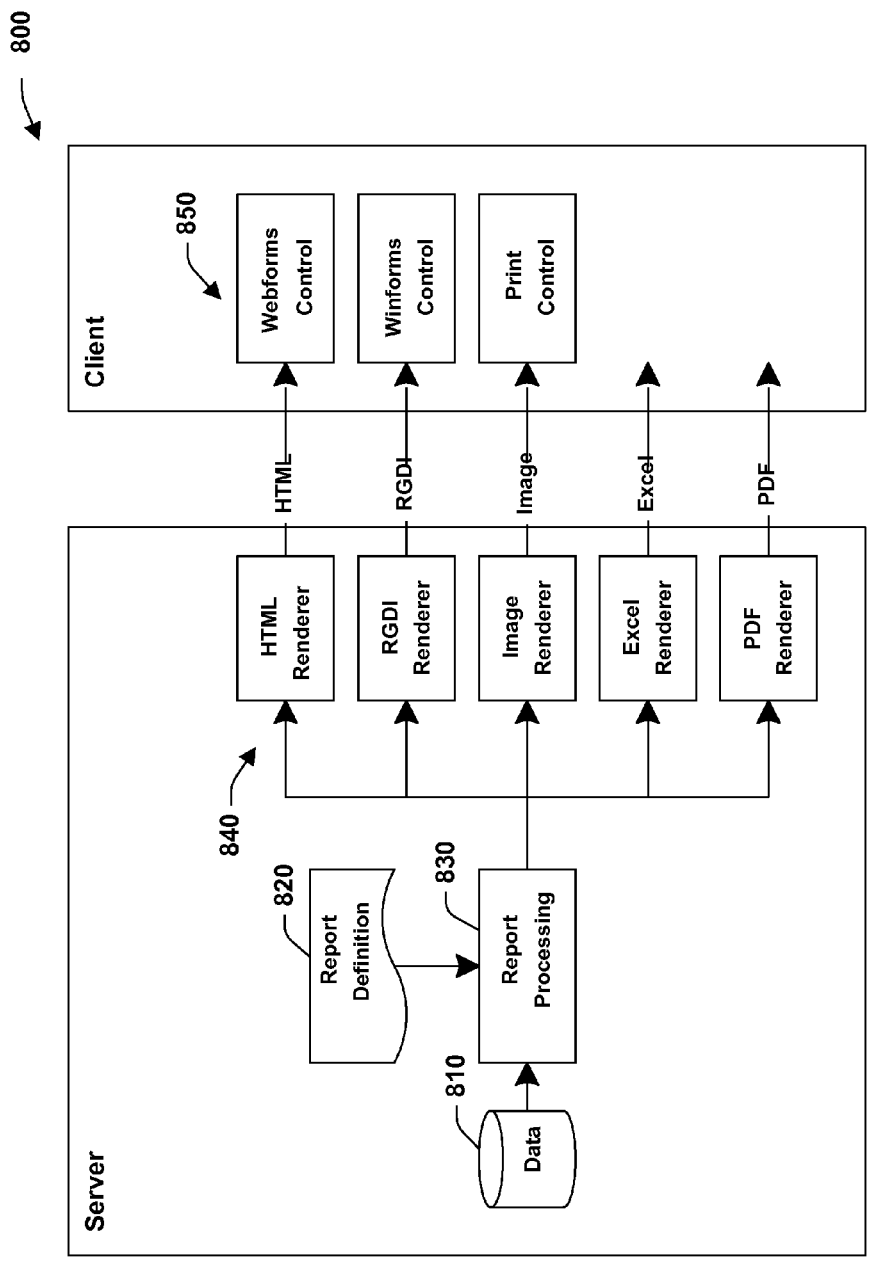
FIG. 8 illustrates an example of a prior art rendering system.

The system 100 provides several architectural aspects, functional aspects, and performance/scaling aspect over previous rendering systems such as depicted in FIG. 8. With respect to architecture, the system 100 provides separation of layout/pagination from target output generation, where the output 150 of the format component 140 is independent of the target rendering format. This provides an architecture-independent model whereby the output of the format component 140 can be utilized via either an object model or a stream, allowing for both in-memory architectures and client-server architectures.

In addition, the object model can be layered atop the stream and populated incrementally in cases where full population of an object model would be too memory-intensive. This allows for greater scalability if desired at the trade-off of some performance. The architecture also facilitates optional out-of-band resources. For example, in a client-server streamed case, large resources (e.g., images) can be referenced by metadata in the stream and retrieved from the server in an efficient out-of-band call.

With respect to system 100 functionality, end-user interactivity can be enhanced. For instance, metadata describing available predefined end-user actions (e.g., sort and drill-down) are described in a target-independent way. Also, since the full structure of a page is available to the client or remote machine 160, some previously unavailable forms of interactivity can be implemented on the client (such as non-predefined visual sort). Other functional aspects include improved edit-ability. Thus, metadata linking rendered objects back to the original output/layout definition is optionally provided, enabling rich clients the ability to provide runtime edits to the definition. A configurable pagination model is also provided by the system 100, where a common approach can be used for multiple pagination models. In particular, it can be used for both rendering targets with hard physical page limits (e.g., PDF) and for rendering targets with soft physical page limits (e.g., HTML). Similarly, it can be used in cases where all pages are rendered at once (e.g., MHTML) or where pages are rendered one at a time (e.g., direct screen drawing).

With respect to performance and scaling enhancements, single-pass generation can be employed to limit memory usage and optimize performance on servers or other engines. In the client-server example, a page layout stream can be generated in a single pass over the data, thereby sharply constraining memory usage (deferring potentially memory-intensive operations to the client) and avoid costly multi-pass or seek operations on the report data. Thus, a stream structure which is described in more detail below allows efficient rendering on client.

Other performance aspects include use of internal pointers within the streaming format that allows clients to scale between memory-intensive or processing intensive calculation. This includes configurable options about whether final sizes are calculated on the server or client. Also, final layout changes due to growing items (e.g., textboxes with variable length text or image controls with variable size images) can be calculated on the server or deferred to the client. Before proceeding, it is noted that the system 100 can be provided as part of a graphical display system or architecture. This includes means for determining graphical rules (layout component 110) to drive a remote output device 130. This also can include means for communicating the graphical rules according to a generic protocol 150, where the generic protocol can be employed as input for a set of output control components provided by the remote machine 160.

Figure 2:
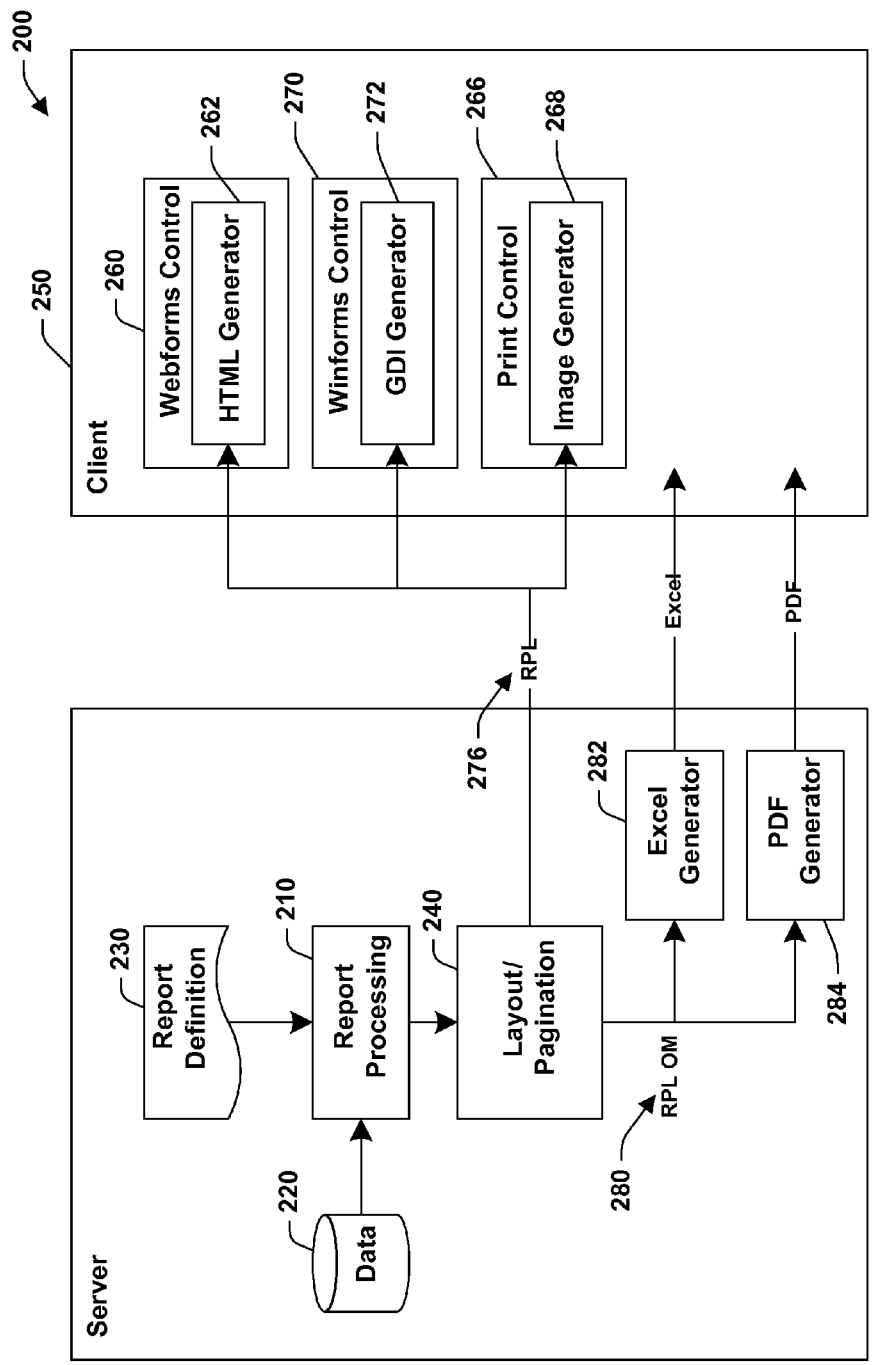
FIG. 2 is a schematic block diagram that illustrates an example client/server architecture for a graphical display system.

Referring now to FIG. 2, a system 200 illustrates an example client/server architecture for graphical display of data. The system 200 presents a simplified view of an example rendering architecture. It is to be appreciated that a plurality of other configurations are possible. When a client application requests one or more pages of a report in a target format, a Report Processing module 210 acts upon data 220 based on instructions included in a Report Definition 230. The resulting processed report data is provided to a common layout and pagination module 240, which performs layout and pagination calculations based on options provided to it by an output generation module at a client 250. For example, when a Web-forms control 260 requests a single page of a report, it can instruct the layout/pagination module 240 to be flexible about page length and to ignore variable text and image sizes, as these can be handled by an HTML Generator component 262. In another example, a Print control 266 having an image generator 268 can instruct the layout/pagination module 240 to be strict about page length and to calculate exact text and image sizes. As shown, another control includes a Win-forms control 270 is another option having a GDI generator 272.

In cases where there exists a client control, the layout/pagination module 240 generates a Report Page Layout (RPL) stream at 276, for the requested page(s), which it then passes to the respective client application. It is noted that the structure of the RPL stream 276 will be described in more detail below with respect to FIGS. 4-7. The client application then transforms this format-independent stream 276 into the target format (e.g., for Web-forms control 260: HTML; for the Win-forms control 270: direct screen drawing instructions; for the Print control 266: an image file). In cases without a client control, the layout/pagination module 240 exposes the Report Page Layout via an object model (RPL OM at 280) rather than a stream. According to this object model, the chosen renderer (e.g., Excel Generator 282, PDF Generator 284) translates RPL into the target output format which is then downloaded to the client machine.

In addition to the description of the visual layout and content of the page, various forms of metadata can be embedded within the RPL stream 276 or RPL OM 280. This includes metadata describing available end-user actions (e.g., sort and drilldown), instructions for retrieving images from the server (rather than embedding them in the stream), definition information which maps displayed objects back to the report definition (enabling client controls to provide runtime edit capability) and objects which are not initially displayed but may become visible based on client-side actions (enabling such aspects as client-side drilldown).

The RPL stream 276 can be generated in a single top-to-bottom pass over the data, retaining the hierarchical structure of the objects on the page. This approach, while memory efficient on the server, results in an RPL structure which cannot (generally) be interpreted in a single forward pass by client output generation modules. To facilitate efficient client-side calculations, RPL 276 also can include numerous offsets/pointers within the stream, to allow clients the ability to "seek" within the stream for needed information. The RPL stream format will be described in more detail below with respect to FIGS. 4-7.

Figure 3:
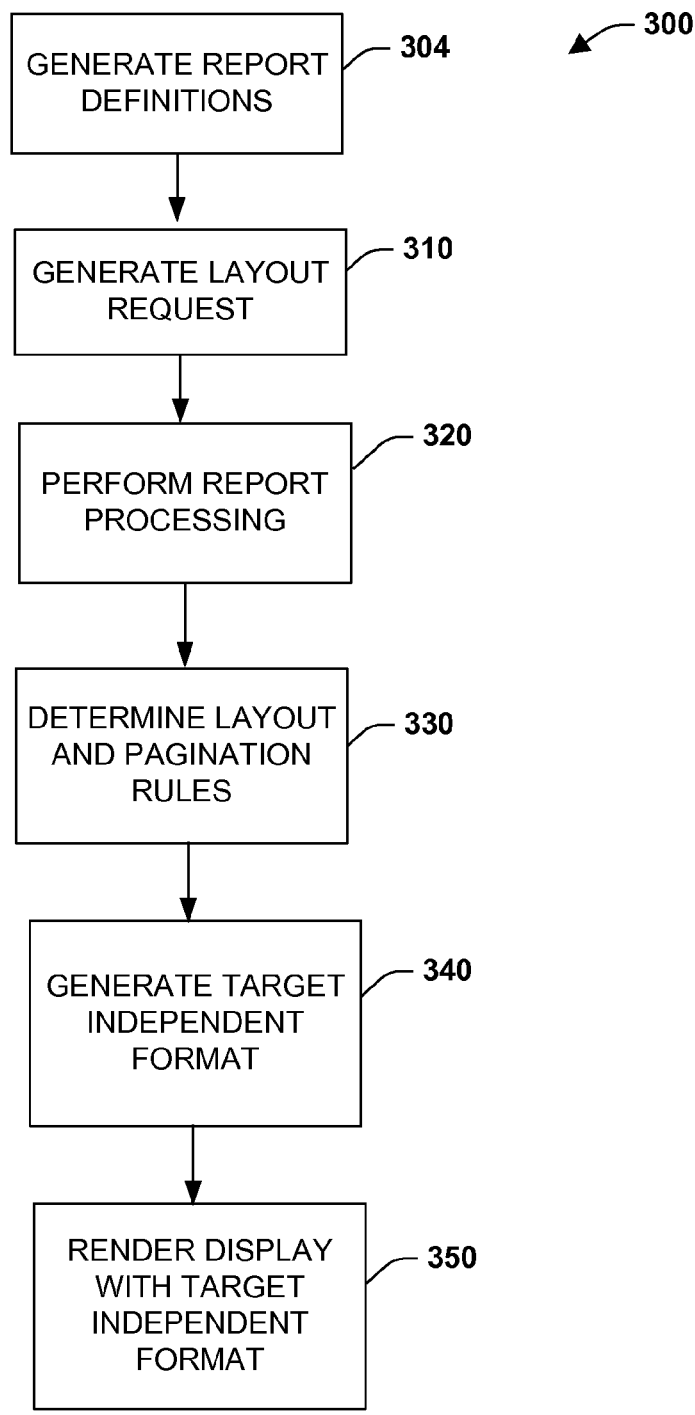
FIG. 3 is a flow diagram that illustrates a process for driving a graphical display system.

FIG. 3 illustrates exemplary processes 300 for driving a graphical display system. While, for purposes of simplicity of explanation, the process is shown and described as a series or number of acts, it is to be understood and appreciated that the subject processes are not limited by the order of acts, as some acts may, in accordance with the subject processes, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject processes described herein.

Proceeding to 304 of FIG. 3, report definitions are generated. At 310, a request for layout is generated. Such as request could be generated from a client-side application requesting data to be displayed at a computer output device for example. At 320, report processing is performed. This can include queries are processing of rows and columns for example in order to organize in a viewable form (e.g., in a table form). At 330, layout and pagination rules are applied to the data that was processed at 320. This can include determining how pages organized and viewed such as determining font sizes, page breaks, colors, number of lines per page, and so forth. At 340, a target independent format is generated from the layout and pagination rules determined at 330. Such independent format specifies how pages are to be displayed yet without a target specific protocol employed. For example, a page view may be specified generically according to a Report Page Layout stream described below as opposed to a target specific protocol such as HTML or other format. At 350, a display is rendered according to instructions specified by the target independent protocol. One or more output controls or other applications can be provided to render according to the instructions provided by the target independent protocol.

Figure 4:
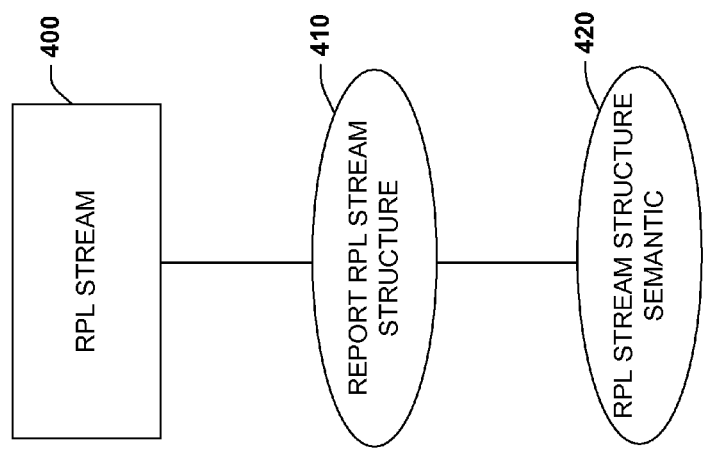
FIGS. 4-7 illustrate example portions or snippets of a Remote Page Layout Stream format or protocol.

FIGS. 4-7 illustrate example portions or snippets from a possible data stream format associated with the claimed aspects described herein. It is to be appreciated that an actual stream can include more or less than the examples data structures shown and that other stream structures and combinations are possible. Turning to FIG. 4, an example Report Page Layout (RPL) stream 400 is illustrated. The RPL stream 400 includes a report RPL stream structure 410 and a report RPL stream structure semantic 420. It is noted that the following stream and protocol examples are illustrative in nature and not intended to be a comprehensive list of possible formatting variables or other type data. Similarly, streams may be generated that have less than the examples shown.

With respect to the RPL stream 400, this may be provided as a binary stream that contains report metadata to describe a page. The stream 400 preserves the report hierarchy, where the left and top properties of an item are relative to a parent. Report item measurements are saved at a parent level, where their data type is "single" and represents the value in millimeters. The stream 400 can have a built in offset based hierarchy that allows a reader to jump from a parent to a child and read the rendering runtime sizes without reading all the properties. Offsets can be stored on 64 bits. To optimize the space, some structures can be shared between report items so they will be written once; for example: constant styles, images embedded multiple times, constant report item properties, and so forth. Numeric values can be Int32s unless otherwise specified. Date time values are written like long values, where Boolean is defined as 0 for false, 1 for true. Generally, the RPL stream 400 serves at least three purposes:

1) It controls memory consumption for very large reports.
2) It decouples the pagination from the renderer, so the rendering task can be performed on server/client basis.
3) It enables client edits.

Semantics of RPL format include (A)=structure A is optional where {A|B}=only one of the elements should be present. The following table illustrates an example report RPL stream structure 410:

| Name | Token | Type |
|---|---|---|
| ReportStart | 0x00 | Report |
| PageStart | 0x01 | Page |

-continued

| Name | Token | Type |
|---|---|---|
| ReportPropertiesStart | 0x02 | ReportProperties |
| PagePropertiesStart | 0x03 | PageProperties |
| PageHeader | 0x04 | ReportElementToken |
| PageFooter | 0x05 | ReportElementToken |
| Body | 0x06 | ReportElementToken |
| TextBox | 0x07 | ReportItemsToken |
| Line | 0x08 | ReportItemsToken |
| Image | 0x09 | ReportItemsToken |
| Rectangle | 0x0A | ReportItemsToken |
| Chart | 0x0B | ReportItemsToken |
| SubReport | 0x0C | ReportItemsToken |
| Tablix | 0x0D | ReportItemsToken |
| ElementPropsStart | 0x0E | ElementProps |
| MeasurementsStart | 0x0F | Measurements |
| TablixStructureStart | 0x10 | TablixStructure |
| TablixBodyRowStart | 0x11 | TablixBodyRow |
| OffsetsArrayElementStart | 0x12 | OffsetsArrayElement |
| PageContentStart | 0x13 | PageContent |
| ColumnsElement | 0x14 | Columns |
| ElementEnd | 0xFE | byte |
| Delimiter | 0xFF | byte |

The following shows an example RPL stream structure semantic 420:

```
public class RPLFormat
{
//Report = ReportStart ReportProperties (PageContent) OffsetsArrayElement
ReportElementEnd
//OffsetsArrayElement = OffsetsArrayElementStart offset count offset[count]
//offset to ReportElementToken
//count = number of pages
//offsets to PageContent ReportElementEnd tokens
//PageContent = PageContentStart ColumnsElement Page Measurements
ReportElementEnd
//Measurements = for ColumnsElement, PageHeader, PageFooter
//ColumnsElement = Columns (BodyElement) Measurements ReportElementEnd
//BodyElement = Body (ElementProps) (ReportItems Measurements)
ReportElementEnd
//Measurements = for Body, PageHeader, PageFooter
//Page = PageStart PageProperties (PageHeaderElement) (PageFooterElement)
Delimiter
//PageHeaderElement = PageHeader (ElementProps) (ReportItems Measurements)
ReportElementEnd
//PageFooterElement = PageFooter (ElementProps) (ReportItems Measurements)
ReportElementEnd
//ReportProperties = ReportPropertiesStart (ItemProps) Delimiter
//PageProperties = PagePropertiesStart (ItemProps) Delimiter
//ReportItems = ReportItemsToken ElementProps ({ReportItems Measurements |
(ReportItems TablixBodyRow) TablixStructure}) ReportElementEnd
//ElementProps = ElementPropsStart {UseShared offset | Shared ItemProps
Delimiter} (NotShared ItemProps Delimiter) Delimiter
//offset points to ElementPropsStart
//Measurements = MeasurementsStart offset count Measurement[count]
//offset to ReportElementToken
//Measurement = left, top, width, height, zindex, State, offset to ReportElementEnd
//State = byte(StateValues)
//TablixStructure = TablixStructureStart offset TablixMeasurements Delimiter
//offset to ReportItemsToken
//TablixBodyRow = TablixBodyRowStart rowIndex (TablixBodyCell) Delimiter
//int32 rowIndex for the cells
//a list of tablix cells for a tablix body row
//ReportElementEnd = ElementEnd offset Delimiter
//marks the end of a report element, it is followed by an offset to:
//Measurements, for non tablix containers
//ReportElementToken, for non-containers
//TablixStructureStart, for tablix
//OffsetsArrayElementStart, we have an array of offsets to ReportElementEnd
}
```

Figure 5:
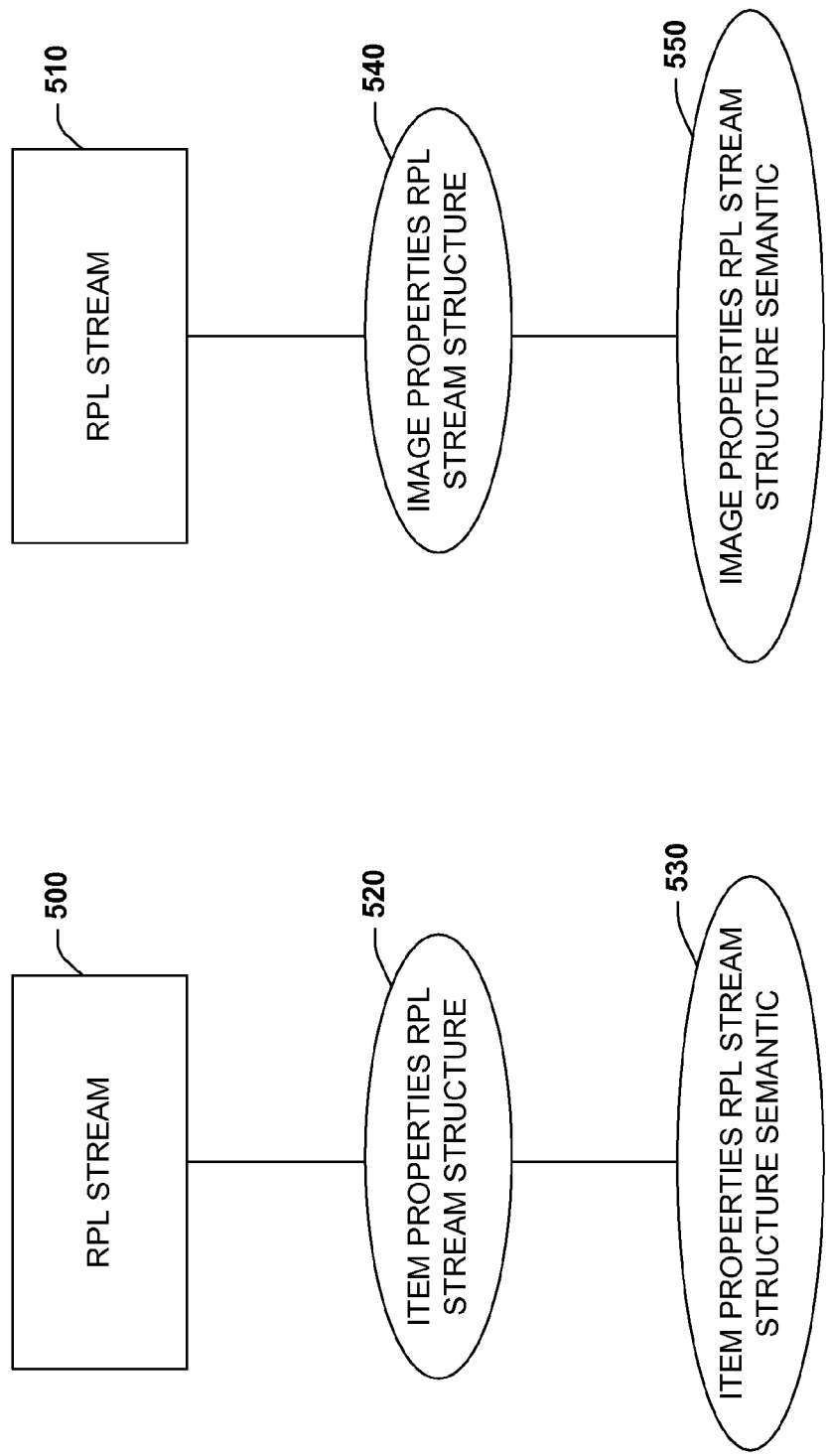

Referring now to FIG. 5, example RPL streams portions 500 and 510 are illustrated. The RPL stream 500 includes an item properties RPL stream structure 520 and an item properties stream structure semantic 530. The following table is an example of an item properties RPL stream structure 520:

| Name | Token | Type |
|---|---|---|
| UniqueName | 0x00 | String |
| ID | 0x01 | String |
| Name | 0x02 | String |
| Label | 0x03 | String |
| Bookmark | 0x04 | String |
| ToolTip | 0x05 | String |
| StyleStart | 0x07 | Style |
| ActionInfoStart | 0x08 | ActionInfo |
| Description | 0x09 | String |
| Location | 0x0A | String |
| Language | 0x0B | String |
| ExecutionTime | 0x0C | DateTime |
| Author | 0x0D | String |
| AutoRefresh | 0x0E | Integer |
| ReportName | 0x0F | String |
| PageHeight | 0x10 | Single |
| PageWidth | 0x11 | Single |
| Slant | 0x12 | 1 = draw from (left, top) to (right, bottom); 0 = draw from (left, bottom) to (right, top) |
| CanGrow | 0x13 | Boolean |
| CanShrink | 0x14 | Boolean |
| Value | 0x15 | String |
| ToggleState | 0x16 | Boolean |
| CanSort | 0x17 | Boolean |
| SortState | 0x18 | SortOptions |
| Formula | 0x19 | String |
| IsToggleParent | 0x1A | Boolean |
| TypeCode | 0x1B | TypeCode |
| OriginalValue | 0x1C | Object |
| ActionImageMapAreasStart | 0x1D | ActionImageMapAreas |
| ChartDataStart | 0x1E | ChartData |
| Sizing | 0x1F | Sizings enum |
| ImageStart | 0x20 | Image |
| LinkToChild | 0x21 | String |
| StreamName | 0x22 | String |

The following is an example of an item properties stream structure semantic 530:

```
public class ItemProps
{
    //Style = StyleStart
        {
            ({UseShared offset | Shared StyleProps Delimiter})
            NotShared StyleProps Delimiter
            |
            {UseShared offset | Shared StyleProps Delimiter}
            (NotShared StyleProps Delimiter)
        }
    //offset points to StyleStart
    //ActionInfo = ActionInfoStart ActionInfoProps Delimiter
    //ActionImageMapAreas = ActionImageMapAreasStart count
ActionInfo[count]
    //ChartData = ChartDataStart count bytes[count]
    //Image = ImageStart {UseShared offset | Shared ImageProps
            Delimiter |NotShared ImageProps Delimiter}
    //offset points to ImageStart
    //stream name for chart (C_UniqueName_PageNumber)
}
```

With respect to the RPL stream 510 of FIG. 5, the following table is an example of an image properties RPL stream structure 540:

| Name | Token | Type |
|---|---|---|
| ImageMimeType | 0x00 | String |
| ImageName | 0x01 | String |
| ImageDataStart | 0x02 | ImageData |
| Width | 0x03 | Integer |
| Height | 0x04 | Integer |
| HorizontalResolution | 0x05 | Single |
| VerticalResolution | 0x06 | Single |
| RawFormat | 0x07 | ImageRawFormat enum |

The following is an example of an image properties RPL stream structure semantic 550:

```
public class ImageProps
{
    //ImageData = ImageDataStart count bytes[count]
    //Regarding the five properties (Width, Height, HorizontalResolution,
VerticalResolution, ImageFormat), either all or none should be present
}
```

Figure 6:
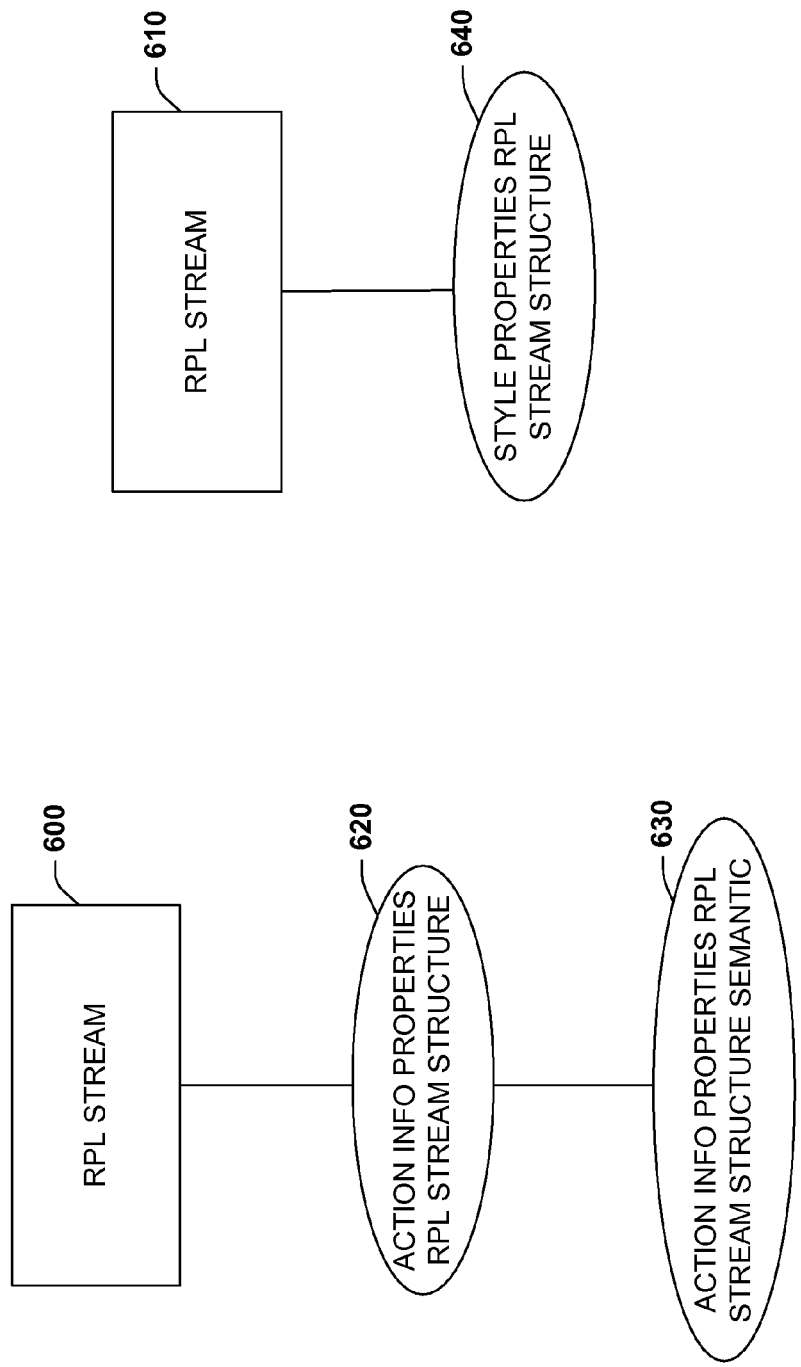

Turning to FIG. 6, example RPL stream portions 600 and 610 are illustrated. The RPL stream 600 includes an action info properties RPL stream structure 620 and an action info properties stream structure semantic 630. The following table is an example of an action info properties RPL stream structure 620:

| Name | Token | Type |
|---|---|---|
| ActionInfoStyleStart | 0x00 | ActionInfoStyle |
| LayoutDirection | 0x01 | LayoutDirection enum |
| ActionsStart | 0x02 | Actions |
| ActionStart | 0x03 | Action |
| Label | 0x04 | string |
| ActionStyleStart | 0x05 | ActionStyle |
| HyperLink | 0x06 | string |
| BookmarkLink | 0x07 | string |
| DrillthroughId | 0x08 | string |
| DrillthroughUrl | 0x09 | string |
| ImageMapAreasStart | 0x0A | ImageMapAreas |

The following table is an example of an action info properties RPL stream structure semantic 630:

```
public class ActionInfoProps
{
    //ActionInfoStyle = ActionInfoStyleStart
        {
            ({UseShared offset | Shared StyleProps Delimiter})
            NotShared StyleProps Delimiter
            |
            {UseShared offset | Shared StyleProps Delimiter}
            (NotShared StyleProps Delimiter)
        }
    //Actions = ActionsStart count Action[count]
    //Action = ActionStart (Label) (ActionStyle) ({Hyperlink |
BookmarkLink | DrillthroughId DrillthroughUrl (BookmarkLink)})
Delimiter
    //ActionStyle = ActionStyleStart
        {
            ({UseShared offset | Shared StyleProps Delimiter}) NotShared
            StyleProps Delimiter
            |
            {UseShared offset | Shared StyleProps Delimiter} (NotShared
            StyleProps Delimiter)
        }
}
```

-continued

```
    //offset points to ActionStyleStart
    //ImageMapAreas = ImageMapAreasStart count
    ImageMapArea[count]
    //ImageMapArea = ShapeType Coordinates ID
    //ShapeType = byte
    //Coordinates = count float[count]
    //ID = string
}
```

With respect to the RPL stream 610 of FIG. 6, the following table is an example of a style properties RPL stream structure 640:

| Name | Token | Type |
|---|---|---|
| BorderColor | 0x00 | String |
| BorderColorLeft | 0x01 | String |
| BorderColorRight | 0x02 | String |
| BorderColorTop | 0x03 | String |
| BorderColorBottom | 0x04 | String |
| BorderStyle | 0x05 | BorderStyles enum |
| BorderStyleLeft | 0x06 | BorderStyles enum |
| BorderStyleRight | 0x07 | BorderStyles enum |
| BorderStyleTop | 0x08 | BorderStyles enum |
| BorderStyleBottom | 0x09 | BorderStyles enum |
| BorderWidth | 0x0A | String |
| BorderWidthLeft | 0x0B | String |
| BorderWidthRight | 0x0C | String |
| BorderWidthTop | 0x0D | String |
| BorderWidthBottom | 0x0E | String |
| PaddingLeft | 0x0F | String |
| PaddingRight | 0x10 | String |
| PaddingTop | 0x11 | String |
| PaddingBottom | 0x12 | String |
| FontStyle | 0x13 | FontStyles enum |
| FontFamily | 0x14 | String |
| FontSize | 0x15 | String |
| FontWeight | 0x16 | FontWeight enum |
| Format | 0x17 | String |
| TextDecoration | 0x18 | TextDecorations enum |
| TextAlign | 0x19 | TextAlignments enum |
| VerticalAlign | 0x1A | VerticalAlignments enum |
| Color | 0x1B | String |
| LineHeight | 0x1C | String |
| Direction | 0x1D | Directions enum |
| WritingMode | 0x1E | WritingModes enum |
| UnicodeBiDi | 0x1F | UnicodeBiDiTypes enum |
| Language | 0x20 | String |
| BackgroundImage | 0x21 | RPL Image |
| BackgroundColor | 0x22 | String |
| BackgroundRepeat | 0x23 | BackgroundRepeatTypes enum |
| NumeralLanguage | 0x24 | String |
| NumeralVariant | 0x25 | Int32 |
| Calendar | 0x26 | Calendars enum |

Figure 7:
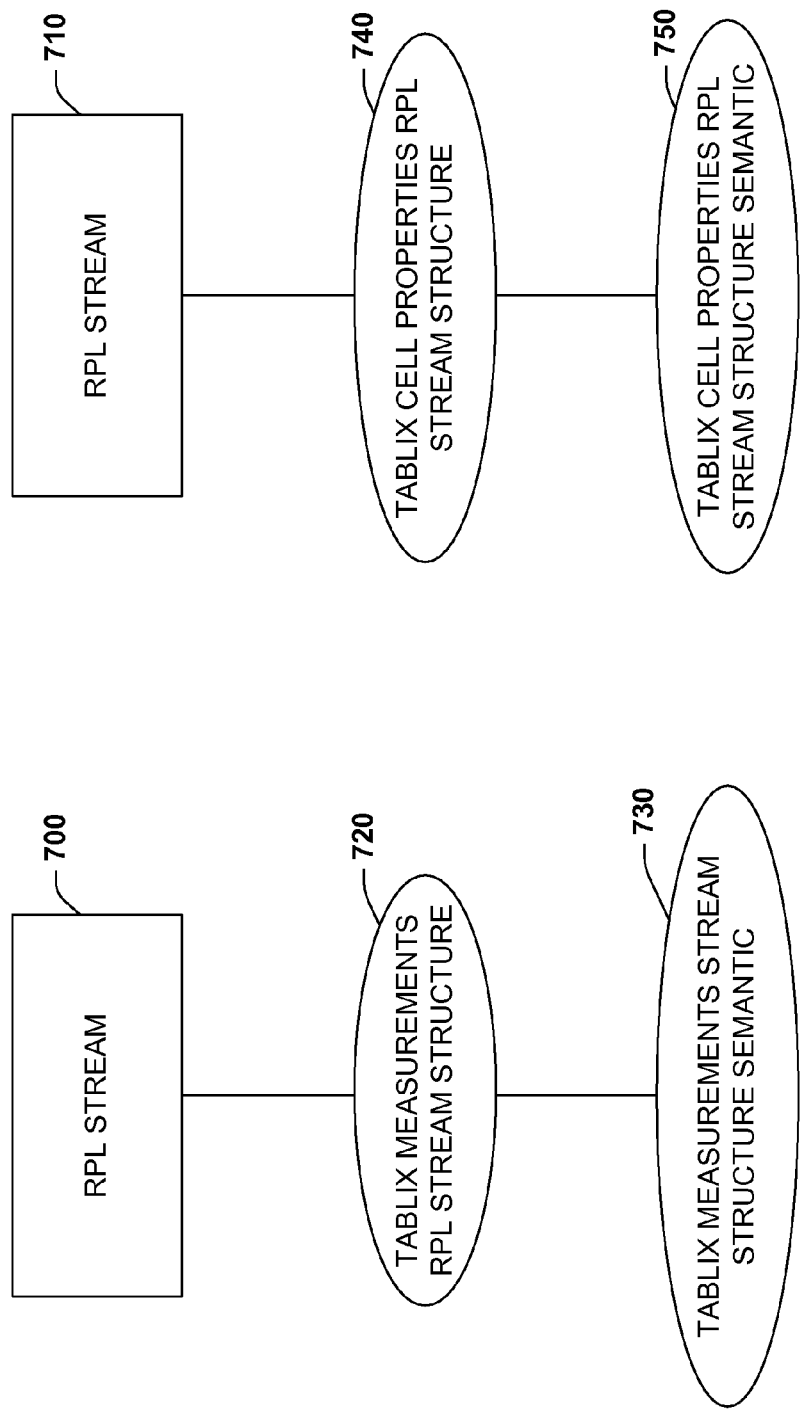

Referring to FIG. 7, example RPL stream portions 700 and 710 are illustrated. The RPL stream 700 includes a tablix measurements RPL stream structure 720 and a tablix measurements RPL stream structure semantic 730. The following table is an example of a tablix measurements RPL stream structure 720:

| Name | Token | Type |
|---|---|---|
| ColumnHeaderRows | 0x00 | Integer |
| RowHeaderColumns | 0x01 | Integer |
| ColsBeforeRowHeaders | 0x02 | Integer |
| ColumnsWidthsStart | 0x03 | Array of (single, byte) pairs |
| RowHeightsStart | 0x04 | Array (single, byte) pairs |
| TablixRowStart | 0x05 | TablixRow |

| Name | Token | Type |
|---|---|---|
| TablixBodyRowCellsStart | 0x06 | TablixBodyRowCells |
| TablixCornerStart | 0x07 | TablixCorner |
| TablixColumnHeaderStart | 0x08 | TablixColumnHeader |
| TablixRowHeaderStart | 0x09 | TablixRowHeader |
| TablixBodyCellStart | 0x0A | TablixBodyCell |
| TablixRowMembersDefStart | 0x0B | TablixRowMembersDef |
| TablixColMembersDefStart | 0x0C | TablixColMembersDef |
| TablixMemberDefStart | 0x0D | TablixMemberDef |
| FixedRows | 0x01 | Bit mask |
| SharedLayoutRow | 0x02 | Bit mask |
| UseSharedLayoutRow | 0x04 | Bit mask |

The following is an example of a tablix measurements RPL stream structure semantic 730:

```
public class TablixMeasurements
{
    //ColumnsWidths = ColumnsWidthsStart count (single, byte)[count]
    //(Width, fixed column) pairs
    //Width = single
    //RowHeights = RowHeightsStart count (single, byte)[count]
    //(Height, (fixed row, shared / use shared layout row)) pairs
    //Height = single
    //TablixRow = TablixRowStart TablixRowContents
    //TablixRowContents = ({TablixCorner | TablixColumnHeader | TablixRowHeader | TablixBodyRowCells}) Delimiter
    //TablixBodyRowCells = TablixBodyRowCellsStart offset
    //offset TablixBodyRowStart
    //TablixCorner = TablixCornerStart (TablixCellProps) Delimiter
    //TablixColumnHeader = TablixColumnHeaderStart (TablixCellProps) Delimiter
    //TablixRowHeader = TablixRowHeaderStart (TablixCellProps) Delimiter
    //TablixBodyCell = TablixBodyCellStart (TablixCellProps) Delimiter
    //TablixRowMembersDef= TablixRowMemberDefStart count (TablixMemberDef)[count]
    //TablixColMembersDef = TablixColMembersDefStart count (TablixMemberDef)[count]
    //TablixMemberDef = TablixMemberDefStart (TablixMemberDefProps) Delimiter
}
```

With respect to the RPL stream 710 of FIG. 7, the following table is an example of tablix cell properties RPL stream structure 740:

| Name | Token | Type |
|---|---|---|
| CellItemOffset | 0x00 | CellItem |
| ColSpan | 0x01 | Integer |
| RowSpan | 0x02 | Integer |
| ZIndex | 0x03 | Integer |
| ColumnIndex | 0x04 | Integer |
| RowIndex | 0x05 | Integer |
| GroupLabel | 0x06 | String |
| UniqueName | 0x07 | String |
| State | 0x08 | StateValues |

The following is an example of a tablix cell properties RPL stream structure semantic 750:

```
public class TablixCellProps
{
    //CellItem = CellItemOffset offset to ReportItemEnd
    //StateValues (HasToggle, ToggleCollapse)
}
```

Figure 9:
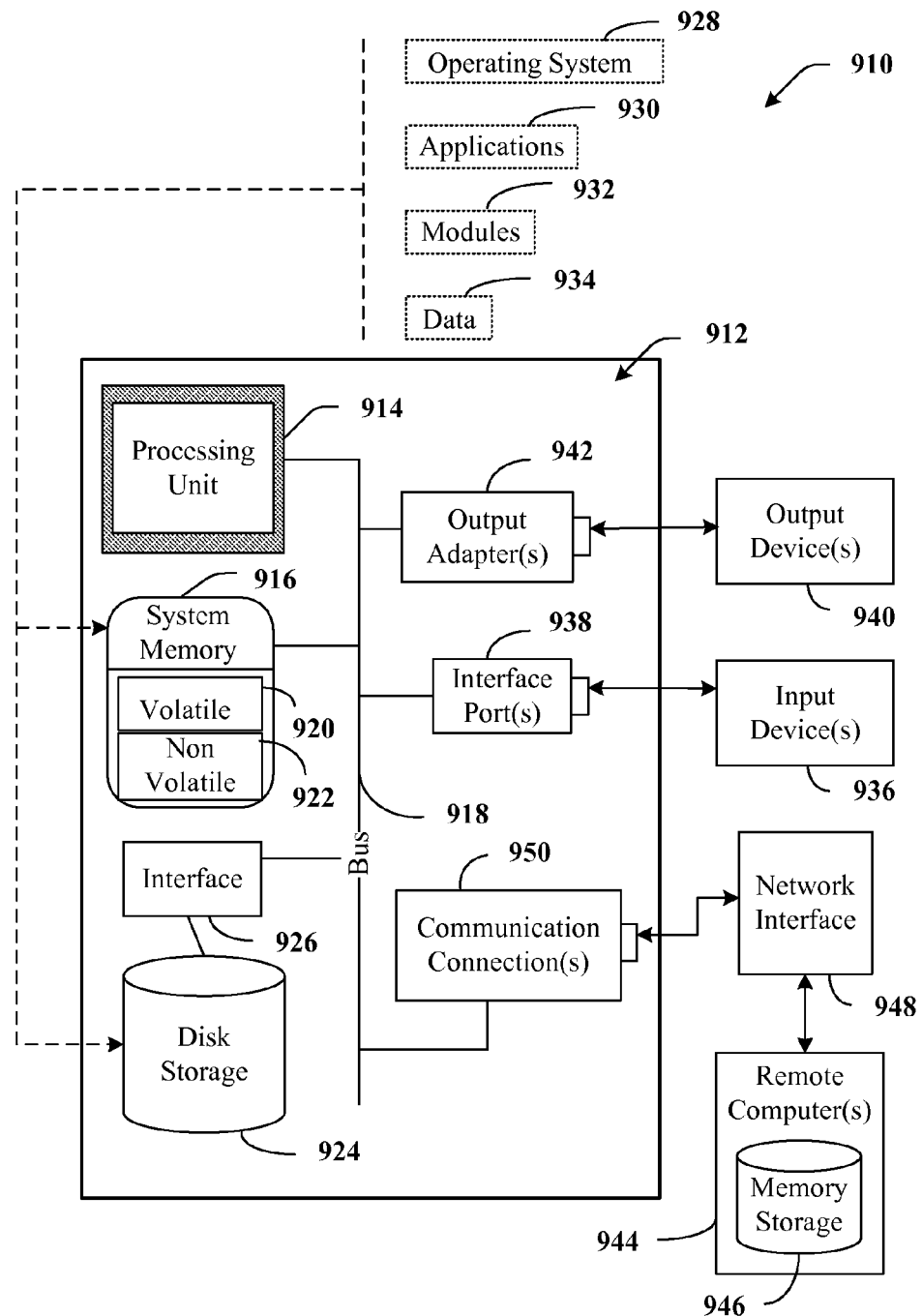
FIG. 9 is a schematic block diagram illustrating a suitable operating environment.
Figure 10:
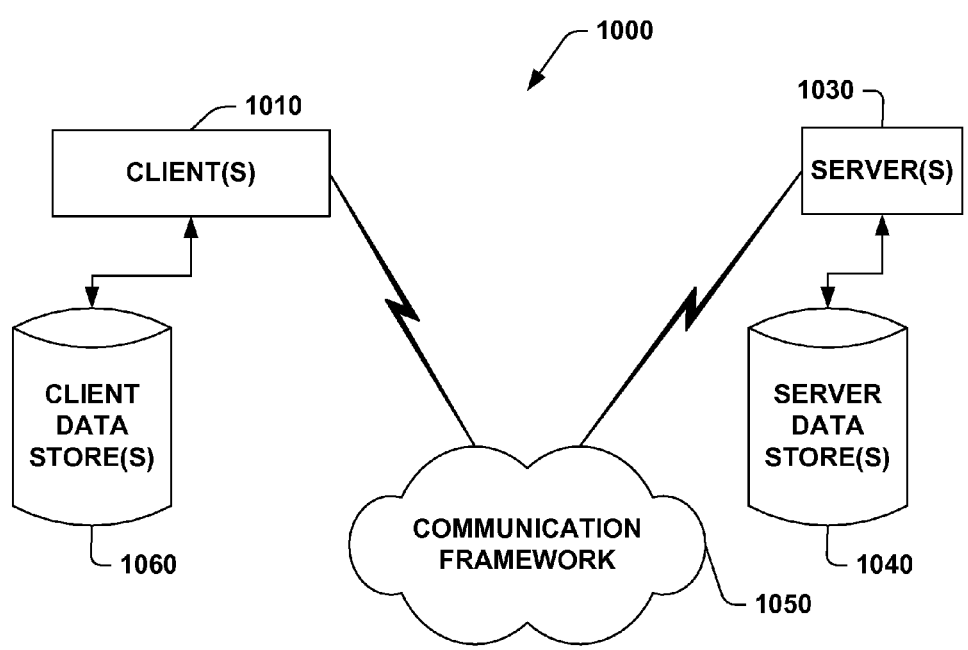
FIG. 10 is a schematic block diagram of a sample-computing environment.

In order to provide a context for the various aspects of the disclosed subject matter, FIGS. 9 and 10 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the invention also may be implemented in combination with other program modules. Generally, program modules include routines, programs, components, data structures, etc. that performs particular tasks and/or implements particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 9, an exemplary environment 910 for implementing various aspects described herein includes a computer 912. The computer 912 includes a processing unit 914, a system memory 916, and a system bus 918. The system bus 918 couple system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/non-removable, volatile/non-volatile computer storage media. FIG. 9 illustrates, for example a disk storage 924. Disk storage 924 includes, but is not limited to, devices like a magnetic disk drive, floppy disk drive, tape drive, Jaz drive, Zip drive, LS-100 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that various components described herein can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912 and to output information from computer 912 to an output device 940. Output adapter 942 is provided to illustrate that there are some output devices 940 like monitors, speakers, and printers, among other output devices 940 that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

FIG. 10 is a schematic block diagram of a sample-computing environment 1000 that can be employed. The system 1000 includes one or more client(s) 1010. The client(s) 1010 can be hardware and/or software (e.g., threads, processes, computing devices). The system 1000 also includes one or more server(s) 1030. The server(s) 1030 can also be hardware and/or software (e.g., threads, processes, computing devices). The servers 1030 can house threads to perform transformations by employing the components described herein, for example. One possible communication between a client 1010 and a server 1030 may be in the form of a data packet adapted to be transmitted between two or more computer processes. The system 1000 includes a communication framework 1050 that can be employed to facilitate communications between the client(s) 1010 and the server(s) 1030. The client(s) 1010 are operably connected to one or more client data store(s) 1060 that can be employed to store information local to the client(s) 1010. Similarly, the server(s) 1030 are operably connected to one or more server data store(s) 1040 that can be employed to store information local to the servers 1030.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer output display system, comprising:
    at least one processing unit; and
    at least one memory communicatively coupled to the at least one processing unit and storing computer-executable instructions that when executed by the at least one processing unit perform a method of providing target-independent instructions for rendering graphical data, the method comprising:
        generating one or more layout and pagination rules for rendering the graphical data, wherein the graphical data has a hierarchical structure described by at least one parent and at least one child;
        processing the one or more layout and pagination rules according to a non-target- specific protocol to generate the target-independent instructions for rendering the graphical data, wherein the target-independent instructions include properties for rendering the graphical data, wherein the properties comprise one or more runtime sizes, wherein the target-independent instructions are generated as a binary stream that preserves the hierarchical structure of the graphical data, and wherein the binary stream comprises an offset-based hierarchy for jumping from the at least one parent to the at least one child to read the one or more runtime sizes without reading all of the properties;
        communicating the target-independent instructions to a first device, wherein the target-independent instructions are transformable into a first format for rendering the graphical data on the first device according to the processed one or more layout and pagination rules; and
        communicating the target-independent instructions to a second device, wherein the target-independent instructions are transformable into a second format for rendering the graphical data on the second device according to the processed one or more layout and pagination rules, wherein the first format and the second format are different.

2. The system of claim 1, wherein processing further comprises generating the target-independent instructions in an object model that supports a client/server configuration.

3. The system of claim 2, wherein the object model is layered on top of the binary stream and is populated incrementally.

4. The system of claim 3, wherein the client/server configuration references resources via metadata in the binary stream.

5. The system of claim 1, the target-independent instructions further comprising metadata that describes end-user actions.

6. The system of claim 1, the target-independent instructions further comprising metadata that links rendered objects to an original data definition.

7. The system of claim 1, the target-independent instructions further comprising configurable pagination that is usable in multiple pagination models.

8. The system of claim 7, wherein the configurable pagination is associated with rendering targets having at least one of: hard physical page limits, soft physical page limits, and all pages rendered concurrently.

9. The system of claim 1, further comprising:
    generating the one or more layout and pagination rules by performing a single pass over the graphical data.

10. The system of claim 1, wherein the binary stream includes one or more internal pointers, wherein the one or more internal pointers allow client devices to scale between memory intensive calculations and processing intensive calculations.

11. The system of claim 10, further comprising determining whether to perform size calculations on a server or a client.

12. The system of claim 1, wherein the non-target-specific protocol generates the binary stream as a Report Page Layout (RPL) stream when a client control exists.

13. The system of claim 12, wherein the RPL stream includes an RPL stream structure and an RPL stream structure semantic.

14. The system of claim 12, wherein the RPL stream includes at least one of an item properties stream, an image properties stream, an action information properties stream, a style properties stream, a tablix measurements stream, and a tablix cell properties stream.

15. A method for generating a target-independent stream for rendering graphical data, the method stored as computer-executable instructions and executed by a processing unit of a computer system, the method comprising:

generating a report definition;

retrieving data, the data having a hierarchical structure described by at least one parent and at least one child;

generating layout and pagination rules for the data according to instructions from the report definition;

processing the layout and pagination rules according to a non-target-specific protocol into the target-independent stream, wherein the target-independent stream includes properties for rendering the data, wherein the properties comprise one or more runtime sizes, wherein the target-independent stream is a binary stream that preserves the hierarchical structure of the data, and wherein the binary stream comprises an offset-based hierarchy for jumping from the at least one parent to the at least one child to read the one or more runtime sizes without reading all of the properties;

communicating the target-independent stream to a first device, wherein the target-independent stream is transformable into a first format for rendering the data according to the processed layout and pagination rules on the first device; and communicating the target-independent stream to a second device, wherein the target-independent stream is transformable into a second format for rendering the data according to the processed layout and pagination rules on the second device, wherein the first format and the second format are different.

16. The method of claim 15, further comprising receiving a remote request to render at least one page.

17. The method of claim 16, further comprising processing the layout and pagination rules according to the non-target-specific protocol into an object model in response to the remote request.

18. The method of claim 17, further comprising generating metadata for at least one of the target-independent stream and the object model.

\* \* \* \* \*